United States Patent [19]
Hu et al.

[11] Patent Number: 5,925,472
[45] Date of Patent: Jul. 20, 1999

[54] ELECTROLUMINESCENT DEVICES

[75] Inventors: Nan-Xing Hu, Oakville; Shuang Xie, Mississauga; Zoran D. Popovic, Mississauga; Beng S. Ong, Mississauga; Ah-Mee Hor, Mississauga, all of Canada

[73] Assignee: Xerox Corporation, Stamford, Conn.

[21] Appl. No.: 08/829,398

[22] Filed: Mar. 31, 1997

[51] Int. Cl.$^6$ .................. H05B 33/00; C07D 271/00; C07D 285/00; C07D 293/00

[52] U.S. Cl. .................. 428/690; 428/457; 428/704; 428/917; 313/504; 313/506; 548/106; 548/108; 548/120; 548/126; 548/136; 548/143; 548/145

[58] Field of Search .................. 428/690, 917, 428/411.1, 457, 704; 313/503, 504, 506; 548/101, 106, 108, 120, 126, 136, 143, 145

[56] References Cited

U.S. PATENT DOCUMENTS

| | | | |
|---|---|---|---|
| 4,356,429 | 10/1982 | Tang | 313/503 |
| 4,539,507 | 9/1985 | VanSlyke et al. | 313/504 |
| 4,769,292 | 9/1988 | Tang et al. | 428/690 |
| 4,950,950 | 8/1990 | Perry et al. | 313/504 |
| 5,150,006 | 9/1992 | VanSlyke et al. | 313/504 |

FOREIGN PATENT DOCUMENTS

| | | |
|---|---|---|
| 0 743 809 | 11/1996 | European Pat. Off. . |
| 0 765 106 | 3/1997 | European Pat. Off. . |
| 896 219 | 5/1962 | United Kingdom . |

OTHER PUBLICATIONS

*Indian J. Pharm. Sci.* (1987), 49 (6), 201–4, Kumar, Atul et al., "Potent Anti–inflammatory 2–o–hydroxyphenyl)–5–(p–dimethylaminophenyl)–1,3,4–oxadiazoles".

*Primary Examiner*—Marie Yamnitzky
*Attorney, Agent, or Firm*—E. O. Palazzo

[57] ABSTRACT

A metal chelate compound of the formula

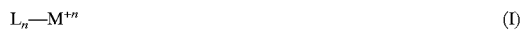

$$L_n\text{—}M^{+n} \qquad (I)$$

wherein M represents a metal; n is an integer, or number of from 1 to 3; and L is a ligand of (II)

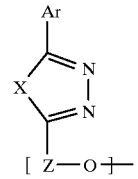

wherein Ar is aryl; X is selected from the group consisting of oxygen, sulfur, and selenium; N is nitrogen; O is oxygen; and Z is a suitable aromatic component.

26 Claims, 1 Drawing Sheet

ELECTROLUMINESCENT DEVICES

PENDING APPLICATIONS AND PATENTS

Illustrated in U.S. Pat. No. 5,763,110 and U.S. Ser. No. 707,260, the disclosures of each application being totally incorporated herein by reference, are EL devices.

Illustrated in U.S. Pat. No. 5,846,666 are certain EL devices with, for example, novel electron transport components; U.S. Ser. No. 08/807,488 illustrates certain EL devices; U.S. Ser. No. 08/807,487 relates to a process for the preparation of Starburst amines, and U.S. Ser. No. 08/807,510 discloses EL devices and photoconductive imaging members containing Starburst amines, the disclosures of each copending application being totally incorporated herein by reference.

In U.S. Pat. No. 5,674,635, the disclosure of which is totally incorporated herein by reference, there is illustrated an electroluminescent device comprised of a polymer of a tetraaryl-substituted biphenyldiamine, such as a copolymer of N,N'-diphenyl-N,N'-bis(3-hydroxyphenyl)-1,1'-biphenyl-4,4'-diamine with a component selected from the group consisting of bisphenyl-A-bischloroformate, ethyleneglycol bischloroformate, diethyleneglycol bischloroformate, adipoylchloride, suberoylchloride and sebacoylchloride, or a siloxane based N,N'-diphenyl-N,N'-bis(3-hydroxyphenyl)-1,1'-biphenyl-4,4'-diamine polymer.

BACKGROUND OF THE INVENTION

This invention is directed to organic electroluminescent (EL) devices, and more specifically, to energy-efficient organic EL devices with enhanced operational stability and improved performance characteristics. The organic EL devices of the present invention enable in embodiments high luminescence, excellent stability, and extended lifetimes, and these EL devices can be selected for use in flat-panel emissive display technologies, including TV screens, computer screens, and the like, and as image bar components for digital copiers and printers. More specifically, the present invention relates to organic EL devices with improved charge injection characteristics, low operation voltages, and which devices are, for example, capable of emitting light with uniform and sufficient luminance, and which devices utilize certain novel metal chelate compounds (I) as electron transporting and electron injecting molecules, or wherein the chelates comprise a zone of the EL device, that is for example a luminescent zone, and wherein the chelates are of the formula $$L_n\text{—}M^{+n} \quad (I)$$

wherein M represents a metal, n is a number of from 1 to 3, and L is a ligand as represented by Formula (II)

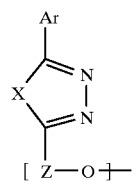

wherein Ar is a suitable aryl, or aryl group sufficient, for example, to complete the formula, and wherein aryl contains, for example, about 6 to about 30 carbon atoms, and aryl includes an aromatic heterocyclic group; X is an atom selected from the group consisting of oxygen, sulfur, and selenium; N is nitrogen; O is oxygen; and Z is an aromatic or aryl component, such as 1,2-phenylene, 1,2-naphthylene, 2,3-naphthylene, 3,4-pyridinediyl, 3,4-quinolinediyl, and the substituted analogs thereof with the substituents being preferably selected from the group consisting of alkyl groups with, for example, 1 to about 5 carbon atoms, phenyl, aryl groups with a substituent of a halogen atom or alkyl, and alkoxy with, for example, 1 to 5 carbons; halogen, a carboxy group, a cyano group, and the like.

PRIOR ART

A simple organic EL device can be comprised of a layer of organic luminescent material conductively sandwiched between an anode, typically comprised of a transparent conductor, such as indium-tin oxide and a cathode, typically a low work-function metal, such as magnesium, calcium, aluminum, or the alloys thereof, with other metals. The EL device functions on the principle that under an electric field, positive charges (holes) and negative charges (electrons) are respectively injected from the anode and cathode into the luminescent layer and undergo recombination to form excitonic states which subsequently emit light. Prior art organic EL devices have been constructed from a laminate of an organic luminescent material and electrodes of opposite polarity, which devices include a single crystal material, such as single crystal anthracene, as the luminescent substance as described, for example, in U.S. Pat. No. 3,530,325. However, these devices require excitation voltages on the order of 100 volts or greater.

An organic EL device with multilayer structure can be a dual layer structure comprising one organic layer adjacent to the anode supporting hole transport, and another organic layer adjacent to the cathode supporting electron transport and acting as the organic luminescent zone of the device. Another alternate device configuration is comprised of three separate layers, a hole transport layer, a luminescent layer, and an electron transport layer, which layers are laminated in sequence and are sandwiched as a whole between an anode and a cathode. Optionally, a fluorescent material can be added to the emission zone or layer so that the recombination of charge carriers and emission of light occur within the fluorescent material, thereby resulting in some improved device performance characteristics such as luminescence efficiency and emission color.

In U.S. Pat. No. 4,539,507, there is disclosed an EL device formed of a conductive glass transparent anode, a hole transporting layer of 1,1-bis(4-p-tolylaminophenyl) cyclohexane, an electron transporting layer of 4,4'-bis(5,7- di-tert-pentyl-2-benzoxzolyl)stilbene also acting as the luminescent zone of the device, and an indium cathode.

U.S. Pat. No. 4,720,432 discloses an improved organic EL device comprising a dual-layer hole injecting and transporting zone, one layer being comprised of porphyrinic compounds supporting hole injection and another layer being comprised of aromatic tertiary amine compounds supporting hole transport.

U.S. Pat. No. 4,769,292 discloses an EL device with a luminescent zone comprised of an organic host material capable of sustaining hole-electron recombination and a fluorescent dye material capable of emitting light in response to energy released by hole-electron recombination.

Further, an organic EL device described by Saito et al. in *Mol. Cryst. Liq. Cryst.* vol. 253, pages 125 to 132 (1994), is comprised of a triarylamine hole transporting layer, a light-emitting layer, and a 1,3,4-oxadiazole electron transporting layer, which layers are laminated in sequence and are sandwiched as a whole between an anode and a cathode.

While recent progress in organic EL research has elevated the potential of organic EL devices for widespread applications, the performance levels of current devices except those described in the applications filed by the assignees of the present application, are still below expectations and require improvement. Further, for visual display applications, organic luminescent materials are needed to provide a satisfactory color in the visible spectrum, normally with emission maxima at about 460, 550 and 630 nanometers for blue, green and red. In most conventional organic EL devices, the luminescent zone or layer is formed of a green-emitting luminophor of tris(8-hydroxyquinolinate) aluminum. Although there have been disclosed blue-emitting organic EL devices, their performance characteristics possess a number of disadvantages such as poor emission hue, high operation voltages, low luminance, and poor operation stability. Thus, there continues to be a need for improved luminescent materials for organic EL devices, which are vacuum evaporable, and thus can form thin-films with excellent thermal stability, and are capable of sustaining electron-hole recombination. Specifically, there is a need for new luminescent materials which are capable of providing blue emission with satisfactory color and sufficient luminance. Further, there is a need for new electron transport materials for organic EL devices to improve their electron transport characteristics and operation stability.

FIGURE

Illustrated in FIG. 1 is an EL device of the present invention.

SUMMARY OF THE INVENTION

It is an object of the present invention to provide improved organic EL devices with many of the advantages illustrated herein.

It is another object of the present invention to provide organic EL devices with novel luminescent compositions.

Further, it is an object of the present invention to provide organic EL devices containing novel electron transport compositions.

In another object of the present invention there is provided an improved organic EL device which is capable of emitting light in the blue or longer wavelength region of the spectrum.

In yet another object of the present invention there is provided a blue-emitting organic EL device with improved electron injection and electron transport characteristics.

Embodiments of the present invention are directed to the light emitting compositions represented by a new class of metal chelate compounds of the formula $$L_n\text{—}M^{+n} \tag{I}$$

wherein M represents a metal, n is a suitable number, such as from 1 to 3, and L is a ligand represented by Formula (II)

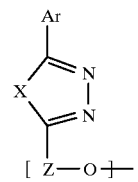

(II)

wherein Ar is an aryl group containing, for example, 6 to about 30 carbon atoms or an aromatic heterocyclic group; X is selected from the group consisting of oxygen, sulfur, and selenium; N is nitrogen; O is oxygen; and Z is a suitable aromatic component, such as 1,2-phenylene, 1,2-naphthylene, 2,3-naphthylene, 3,4-pyridinediyl, 3,4-quinolinediyl, and their substituted analogs with the substituents being preferably selected from the group consisting of alkyl, phenyl, aryl groups with a substituent of halogen, alkyl, or alkoxy halogen, alkoxy, carboxy, cyano, and the like.

The metal chelate compounds possess several advantages. For example, the compounds exhibit the ability to form thin-films with excellent thermal stability by vacuum evaporation; they fluoresce in the blue or longer wavelength region of the visible spectrum, and they transport electrons. Accordingly, the metal chelate compounds of the present invention can be utilized as a single luminescent zone in organic EL devices. More specifically, the metal chelates can be selected as a transporting zone in an EL device, or the EL device may comprise a hole injecting layer in contact with an anode, a hole transport layer in contact with the hole injecting layer, thereover an electron transport layer comprised of the metal chelates of Formula (I), and thereover and situated between a cathode, and in contact therewith, and the electron transporting layer, an electron injecting layer.

In embodiments, the present invention relates to organic EL devices that are comprised in the following order of an anode, a single known organic hole injecting/hole transporting zone or layer, a single electron injecting/electron transporting zone or layer, and a cathode, and wherein the electron injecting/electron transporting zone or layer is comprised of a metal chelate compound as illustrated by Formula (I), and which compound primarily functions as an electron transporting, or a luminescent component.

DESCRIPTION OF EMBODIMENTS

Figure 1:
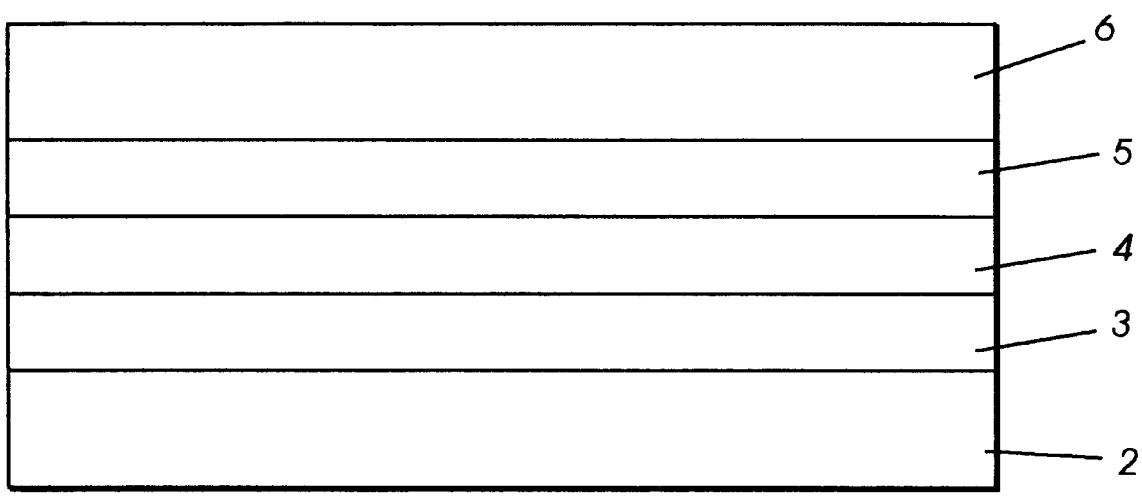

Embodiments of the present invention will be described in more detail with reference to the schematic diagram of FIG. 1.

FIG. 1 illustrates an EL device structure or an organic light emitting diode comprised of a supporting substrate 2 of, for example, glass, an anode 3, a vacuum deposited organic hole injecting and hole transporting zone 4, a vacuum deposited metal chelate Formula (I) electron injecting and electron transporting zone 5, and in contact a cathode 6. In this EL device, a junction can be formed between the hole injecting/transporting zone and the electron injecting/transporting zone. In operation, when the anode is electrically biased to a positive potential with respect to the cathode, holes are injected into the organic hole injecting/transporting zone and transported across this zone to the junction. Concurrently, electrons are injected from the cathode into the electron injecting/transporting zone and are transported toward the junction. Recombination of the holes and electron occurs within the electron injecting/transporting zone to emit light. The device may include between the anode and cathode a separate known hole injecting layer, a known hole transporting layer, a known electron injecting layer in contact with the cathode, and the metal chelate Formula (I) electron transporting layer. Moreover, the electron injection/electron transporting zone may contain thereover a second electron injecting layer, such as a tris aluminum compound illustrated herein.

Also, with respect to FIG. 1, layer 4 can be replaced by two layers, a hole injecting layer in contact with the anode, and comprised of known components that enable hole injection, and a known hole transport layer that enables hole transport; and in place of 5, two layers, one comprised of an electron transport metal chelate compound of Formula (I), and thereover, a known electron injection layer which is in contact with the cathode.

Illustrative examples of supporting substrate include polymeric components, glass and the like, polymers, such as polyesters like MYLAR®, polycarbonates, polyacrylates, polymethacrylates, polysulfones, quartz, and the like. Other substrates can be selected providing, for example, they are essentially nonfunctional and can support the other layers. The thickness of the substrate can be, for example, from about 25 to over 1,000 microns, and more specifically, from about 100 to about 1,000 microns, depending, for example, on the structural demands of the device.

The anode contiguous to the substrate in the organic EL devices of the present invention can be comprised of a metal, an alloy, an electroconducting compound or mixtures thereof, especially with a work function equal to, or greater than about 4 electron volts, for example from about 4 to about 8. Specific examples of anodes include positive charge injecting electrodes such as indium tin oxide, tin oxide, zinc oxide, gold, platinum; electrically conductive carbon, and conjugated polymers such as polyaniline, polypyrrole, and the like. The thickness of the anode can range, for example, from about 10 nanometers to 1 micron with the preferred range be dictated by, for example, the optical constants of the anode material. One preferred range of thickness is from about 10 to about 200 nanometers.

The hole injecting/transporting zone 4 may be of a number of convenient forms. For example, this zone or layer may be comprised of one layer comprising one, two or more of the hole transport components. In another form, zone 4 may be laminately formed of a layer in contact with the anode containing a hole injecting component and a layer containing a hole transporting component interposed between the hole injecting layer and the electron injecting and transporting zone. Any conventional known materials which can inject and transport holes into the luminescent zone may be employed for forming the hole injecting and transporting zone. Preferred hole injecting and hole transporting materials include porphyrin derivatives and aromatic tertiary amines examples of which are disclosed in U.S. Pat. No. 4,720,432, the disclosure of which is totally incorporated herein by reference.

Representative examples of porphyrins and derivatives thereof are porphyrin; 1,10,15,20-tetraphenyl-21H,23H-porphyrin copper (II); copper phthalocyanine; copper tetramethyl phthalocyanine; zinc phthalocyanine; titanium oxide phthalocyanine; magnesium phthalocyanine; and the like.

Illustrative examples of aromatic tertiary amines are bis (4-dimethylamino-2-methylphenyl)phenylmethane, N,N,N-tri(p-tolyl)amine, 1,1-bis(4-di-p-tolylaminophenyl) cyclohexane, 1,1-bis(4-di-p-tolylaminophenyl)-4-phenylcyclohexane, N,N'-diphenyl-N,N'-bis(3-methylphenyl)-1,1'-biphenyl-4,4'-diamine, N,N'-diphenyl-N,N'-bis(3-methylphenyl)-1,1'-biphenyl-4,4'-diamine, N,N'-diphenyl-N,N'-bis(4-methoxyphenyl)-1,1'-biphenyl-4,4'-diamine, N,N,N',N'-tetra-p-tolyl-1,1'-biphenyl-4,4'-diamine, N,N'-di-1-naphthyl-N,N'-diphenyl-1,1'-biphenyl-4,4'-diamine, and the like. Also, the aromatic tertiary amines comprising the hole injecting and transporting zone can be selected from those of polynuclear aromatic amines. Specific examples include N,N-bis-[4'-(N-phenyl-N-m-tolylamino)-4-biphenylyl]aniline; N,N-bis-[4'-(N-phenyl-N-m-tolylamino)-4-biphenylyl]-m-toluidine; N,N-bis-[4'-(N-phenyl-N-m-tolylamino)-4-biphenylyl]-p-toluidine; N,N-bis-[4'-(N-phenyl-N-p-tolylamino)-4-biphenylyl] aniline; N,N-bis-[4'-(N-phenyl-N-p-tolylamino)-4-biphenylyl]-m-toluidine; N,N-bis-[4'-(N-phenyl-N-p-tolylamino)-4-biphenylyl]-p-toluidine; N,N-bis-[4'-(N-phenyl-N-p-chlorophenylamino)-4-biphenylyl]-m-toluidine; N,N-bis-[4'-(N-phenyl-N-m-chlorophenylamino)-4-biphenylyl]-m-toluidine; N,N-bis-[4'-(N-phenyl-N-m-chlorophenylamino)- 4-biphenylyl]-p-toluidine; N,N-bis-[4'-(N-phenyl-N-m-tolylamino)-4-biphenylyl]-p-chloroaniline; N,N-bis-[4'-(N-phenyl-N-p-tolylamino)-4-biphenylyl]-m-chloroaniline; N,N-bis-[4'-(N-phenyl-N-m-tolylamino)-4-biphenylyl]-1-aminonaphthalene and the like.

The electron injecting/transporting layer, or zone 5 is comprised of a novel metal chelate compound of Formula (I)

$$L_n\text{—}M^{+n} \tag{I}$$

wherein M represents a metal, n is a number of from 1 to 3, and L is a ligand of, or as essentially represented by Formula (II)

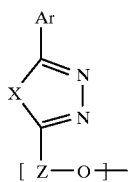
(II)

wherein the substituents are as indicated herein, for example Ar is aryl containing, for example, 6 to about 30 carbon atoms or an aromatic heterocyclic group of, for example, pyridyl, quinolyl, thienyl and the like; X is selected from the group consisting of oxygen, sulfur, and selenium; N is nitrogen; O is oxygen; and Z is a suitable aromatic component, such as 1,2-phenylene, 1,2-naphthylene, 2,3-naphthylene, 3,4-pyridinediyl, 3,4-quinolinediyl, the substituted analogs thereof with the substituents being, for example, alkyl with 1 to about 5 carbon atoms, phenyl, aryl with a substituent of halogen, alkyl or alkoxy groups with, for example, 1 to 5 carbons; halogen alkoxy groups containing, for example, 1 to 3 carbon atoms. Z can also be carboxy, a cyano, and the like. The metal chelates can comprise the entire layer 5, or 5 can be replaced with two layers 5a and 5b, respectively, as indicated therein, and wherein 5a is the metal chelate electron transport layer, and 5b is the electron injector layer.

The metal ion included in Formula (I) may be monovalent, divalent, or trivalent. Specific examples of metal ions include those which are capable of forming a stable chelate compound with the ligand as illustrated in Formula (II), examples of metals being lithium, sodium, beryllium, magnesium, zinc, aluminum and the like, and preferably beryllium and zinc.

Illustrative examples of the ligand represented by Formula (II) include the following F-1
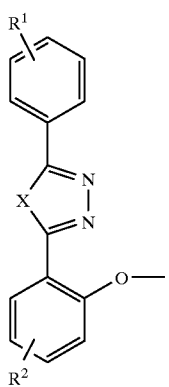

F-2
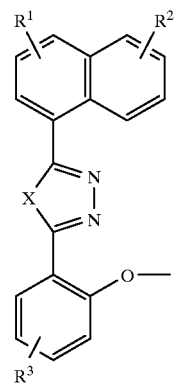

F-3
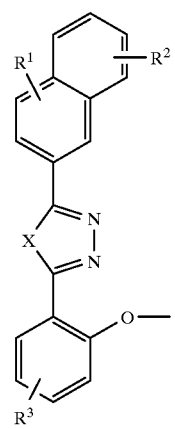

F-4
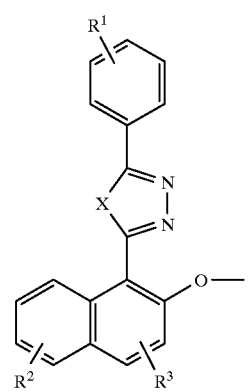

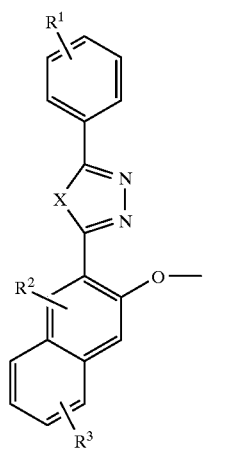
F-5
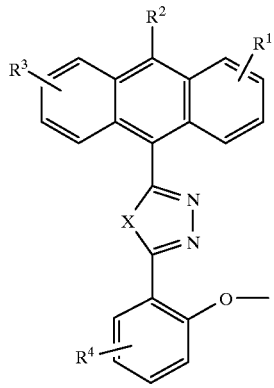
F-8
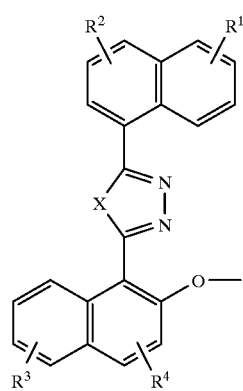
F-6
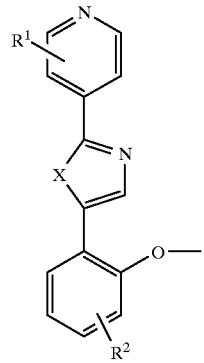
F-9
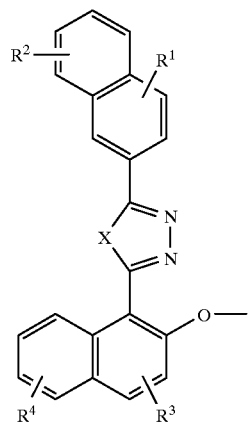
F-7
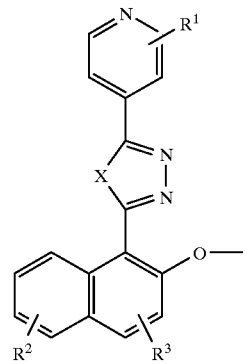
F-10
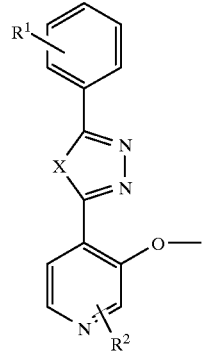
F-11

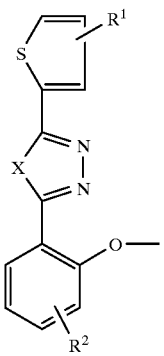

F-12 wherein the substituents are as illustrated herein, and more specifically, wherein X is an atom selected from the group consisting of oxygen, sulfur, and selenium; N is nitrogen; O is oxygen; $R^1$ to $R^4$ are substituents independently selected from the group consisting of alkyl groups with, for example, 1 to about 5 carbon atoms, phenyl, aryl groups with a substituent of halogen atom, alkyl, or alkoxy with 1 to 5 carbons, halogen, carboxy, cyano, and the like.

The metal chelate compounds can be prepared according to the synthetic processes illustrated herein. For example, the metal chelate compounds can be obtained by the reaction of the corresponding alkaline base, such as an alkaline metal hydroxide or an alkaline metal alkoxide, with a chelate compound (III) or its ester derivatives

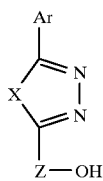

(III)

wherein Ar, X, and Z are as indicated herein.

The metal chelate compounds other than the alkaline metal chelate compound can be prepared by the treatment or reaction of a chelate compound of Formula (III) with the corresponding metal salts. Another process for the synthesis of these metal chelate compounds involves the metal exchange reaction of an alkaline metal chelate compound with a metal salt. In a typical reaction, a chloride salt of a metal selected from Group (II) or Group (III) of the Periodical Table is mixed in a boiling alcoholic solvent of, for example, methanol with a sodium chelate compound of Formula (III). After cooling to room temperature, about 25° C., the precipitated solid metal chelate is then collected by filtration. The structure and composition of the metal chelate compounds can be confirmed by known analytical techniques such as infrared spectra and elemental analysis.

Illustrative examples of metal chelate compounds include bis[2-(2-hydroxyphenyl)-5-phenyl-1,3,4-oxadiazolato]zinc; bis[2-(2-hydroxyphenyl)-5-phenyl-1,3,4-oxadiazolato] beryllium; bis[2-(2-hydroxyphenyl)-5-(1-naphthyl)-1,3,4-oxadiazolato]zinc; bis[2-(2-hydroxyphenyl)-5-(1-naphthyl)-1,3,4-oxadiazolato]beryllium; bis[5-biphenyl-2-(2-hydroxyphenyl)-1,3,4-oxadiazolato]zinc; bis[5-biphenyl-2-(2-hydroxyphenyl)-1,3,4-oxadiazolato]beryllium; bis(2-hydroxyphenyl)-5-phenyl-1,3,4-oxadiazolato lithium; bis[2-(2-hydroxyphenyl)-5-p-tolyl-1,3,4-oxadiazolato]zinc; bis[2-(2-hydroxyphenyl)-5-p-tolyl-1,3,4-oxadiazolato]beryllium; bis[5-(p-tert-butylphenyl)-2-(2-hydroxyphenyl)-1,3,4-oxadiazolato]zinc; bis[5-(p-tert-butylphenyl)-2-(2-hydroxyphenyl)-1,3,4-oxadiazolato]beryllium; bis[2-(2-hydroxyphenyl)-5-(3-fluorophenyl)-1,3,4-oxadiazolato] zinc; bis[2-(2-hydroxyphenyl)-5-(4-fluorophenyl)-1,3,4-oxadiazolato]zinc; bis[2-(2-hydroxyphenyl)-5-(4-fluorophenyl)-1,3,4-oxadiazolato]beryllium; bis[5-(4-chlorophenyl)-2-(2-hydroxyphenyl)-1,3,4-oxadiazolato] zinc; bis[2-(2-hydroxyphenyl)-5-(4-methoxyphenyl)-1,3,4-oxadiazolato]zinc; bis[2-(2-hydroxy-4-methylphenyl)-5-phenyl-1,3,4-oxadiazolato]zinc; bis[2-α-(2-hydroxynaphthyl)-5-phenyl-1,3,4-oxadiazolato]zinc; bis[2-(2-hydroxy phenyl)-5-p-pyridyl-1,3,4-oxadiazolato]zinc; bis[2-(2-hydroxyphenyl)-5-p-pyridyl-1,3,4-oxadiazolato] beryllium; bis[2-(2-hydroxyphenyl)-5-(2-thiophenyl)-1,3,4-oxadiazolato]zinc; bis[2-(2-hydroxyphenyl)-5-phenyl-1,3,4-thiadiazolato]zinc; bis[2-(2-hydroxyphenyl)-5-phenyl-1,3,4-thiadiazolato]beryllium; bis[2-(2-hydroxyphenyl)-5-(1-naphthyl)-1,3,4-thiadiazolato]zinc; and bis[2-(2-hydroxyphenyl)-5-(1-naphthyl)-1,3,4-thiadiazolato] beryllium.

The electron injecting and transporting zone in the EL devices of the present invention may be of a number of convenient forms. For example, the device may be comprised of one layer comprising the metal chelate compound illustrated herein. In another form with a dual-layer structure the electron injecting and transporting zone may include two separate layers as indicated herein, a layer in contact with the cathode containing an electron injecting material and a layer containing a metal chelate compounds of the present invention interposed between the electron injecting layer and the hole injecting and transporting zone. The electron injecting layer primarily functions to improve the electron injection characteristics of the EL devices. Illustrative examples of electron injecting compounds, which can be present as a layer in contact with the cathode, which layer can be of various effective thicknesses, for example from about 50 Angstroms to about 800 Angstroms, include metal oxinoid compounds and the chelate compounds of 10-hydroxybenzo[h]quinoline and the derivatives thereof. Illustrative examples of the metal chelated compounds include tris(8-hydroxyquinolinate)aluminum, tris(8-hydroxyquinolinate)gallium, bis(8-hydroxyquinolinate) magnesium, bis(8-hydroxyquinolinate)zinc, tris(5-methyl-8-hydroxyquinolinate)aluminum, tris(7-propyl-8-quinolinolato)aluminum, bis[benzo{f}-8-quinolinate]zinc, bis(10-hydroxybenzo[h]quinolinate)beryllium; the metal thioxinoid compounds, illustrated in U.S. Pat. No. 5,846,666, the disclosure of which is totally incorporated herein by reference. Illustrative examples of metal thioxinoide compounds include bis(8-quinolinethiolato)zinc, bis(8-quinolinethiolato)cadmium, tris(8-quinolinethiolato) gallium, tris(8-quinolinethiolato)indium, bis(5-methylquinolinethiolato)zinc, tris(5-methylquinolinethiolato)gallium, tris(5-methylquinolinethiolato)indium, bis(5-methylquinolinethiolato)cadmium, bis(3-methylquinolinethiolato)cadmium, bis(5- methylquinolinethiolato)zinc, bis[benzo{f}-8-quinolinethiolato]zinc, bis[3-methylbenzo{f}-8-quinolinethiolato]zinc, bis[3,7-dimethylbenzo{f}-8-quinolinethiolato]zinc, and the like.

In embodiments of the present invention, the total thickness of the organic luminescent medium, which includes the hole injecting/transporting zone 4 and the electron injecting/transporting zone 5, is less than about 1 micron, and preferably is from about 400 Å to about 4000 Å, primarily to maintain a current density that permits efficient light emission under a relatively low voltage applied across the electrodes. Suitable thickness of the hole injecting and transporting zone can range from about 50 to about 2,000 Å, and preferably from about 400 to 1,000 Å. Similarly, the thickness of the electron injecting and transporting zone can range from about 50 to about 2,000 Å, and preferably from about 400 to 1,000 Å.

The cathode 6 can be comprised of any metal, including high or low work function metals. The cathode which can be derived from a combination of a low work function metal (less than about 4 eV, for example from about 2 to about 4) and at least one, and preferably another second metal can provide additional advantages such as improved device performance and stability. Suitable amounts of the low work function metal to the second metal may range from less than about 0.1 percent to about 99.9 percent by weight. Illustrative examples of low work function metals include alkaline metals, Group 2A or alkaline earth metals, and Group III metals including rare earth metals and the actinide group metals. Lithium, magnesium and calcium are particularly preferred.

The thickness of cathode 6 ranges from, for example, about 10 to about 5,000 Å. The Mg:Ag cathodes of U.S. Pat. No. 4,885,211, illustrate one preferred cathode construction. Another preferred cathode construction is described in U.S. Pat. No. 5,429,884, wherein the cathodes are formed from lithium alloys with other high work function metals such as aluminum and indium. The disclosures of each of the above two patents are totally incorporated herein by reference.

Both anode 3 and cathode 6 of the EL devices of the present invention can be of any convenient forms. A thin, for example from about 200 to about 500 Angstroms, layer can be coated onto a light transmissive substrate, for example a transparent or substantially transparent glass plate or plastic film. The EL device can include a light transmissive anode 3 formed from tin oxide or indium tin oxide coated on a glass plate. Also, very thin, for example less than about 200 Å, and more specifically, from about 100 to about 200 Angstroms, light-transparent metallic anodes can be selected, such as gold, palladium, and the like. In addition, transparent or semitransparent thin layers of conductive carbon or conjugated polymers, such as polyaniline, polypyrrole and the like, and mixtures thereof with indium tin oxide, tin oxide, and other transparent electrode materials, can be selected as anodes. Further suitable forms of the anode 3 and cathode 6 are illustrated by Tang et al. referenced herein.

In embodiments, the EL device comprises, in the following order, an anode of indium tin oxide on a substrate of glass; and which indium tin oxide or similar anode is, for example, of a thickness of from about 300 to about 1,000 Angstroms; a hole injecting/hole transporting layer comprised of an amine, such as a tertiary amine, and which layer is of a thickness, for example, of from about 100 to about 800 Angstroms; a single electron transporting/electron injecting layer comprised of a metal chelate of Formula (I) with a thickness, for example, of from about 100 to about 800 Angstroms; and a cathode of a magnesium/silver alloy, and which cathode is of a thickness of, for example, from about 100 to about 2,000 Angstroms.

Embodiments of the present invention include a metal chelate compound of the formula

$$L_n\text{—}M^{+n} \quad (I)$$

wherein M represents a metal; n is an integer, or number of from 1 to 3; and L is a ligand of

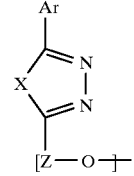

(II)

wherein Ar is aryl; X is selected from the group consisting of oxygen, sulfur, and selenium; N is nitrogen; O is oxygen; and Z is a suitable aromatic component; an organic electroluminescent device comprised of an anode and a cathode, and situated therebetween (a) a hole injecting and hole transporting layer or zone, and thereover (b) an electron injecting and electron transport layer or zone containing the metal chelate compound (I)

$$L_n\text{—}M^{+n} \quad (I)$$

wherein M represents a metal; n is a number of from 1 to 3; and L is a ligand of the Formula (II)

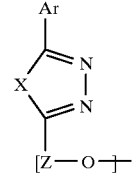

(II)

wherein Ar is aryl; X is selected from the group consisting of oxygen, sulfur, and selenium; N is nitrogen; O is oxygen; and Z is an aromatic component; an organic electroluminescent device wherein the metal is selected from the metals in Group (I), Group (II) and Group (III) of the Periodic Table; an organic electroluminescent device wherein the metal is zinc or beryllium; an organic electroluminescent device comprising in the following sequence a substrate, thereover an anode, in contact with the anode two layers, a hole injecting layer and thereover a hole transport layer, thereover two layers, an electron transport layer and an electron injecting layer, and a cathode; and wherein the cathode is in contact with the electron injecting layer; an electroluminescent device comprised of a metal chelate compound of the formula

$$L_n\text{—}M^{+n} \quad (I)$$

wherein M represents a metal; n is a number of from 1 to 3; and L is a ligand of the formula

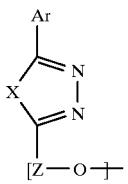
(II)

wherein Ar is aryl; X is selected from the group consisting of oxygen, sulfur, and selenium; N is nitrogen; O is oxygen; and Z is a suitable aromatic component; an electroluminescent device wherein the anode is comprised of a layer of indium tin oxide having a thickness ranging from about 300 Å to about 1,000 Å, the hole injecting/hole transporting layer is comprised of a tertiary aromatic amine and which layer is of a thickness ranging from about 100 Å to about 800 Å, the electron injecting/electron transporting metal chelate layer is of a thickness ranging from about 100 Å to about 800 Å, and the cathode is a magnesium/silver alloy or a lithium/aluminum alloy and which cathode is of a thickness ranging from about 100 Å to about 2000 Å; an electroluminescent device wherein the device further comprises in the following sequence a substrate, an anode, a hole injecting layer, a hole transport layer, an electron transport layer, an electron injecting layer, and a cathode; and wherein the electron transport layer is comprised of the metal chelate; and an electroluminescent device comprised of (a) an anode on an optional supporting substrate; (b) a hole transporting hole injecting layer; (c) an electron transporting electron injecting layer; and (d) a cathode; wherein the layer (c) is comprised of the metal chelate compound of the formula

(I)

wherein M represents a metal; n is an integer, or number of from 1 to 3; and L is a ligand of

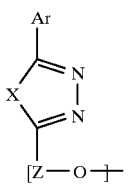
(II)

wherein Ar is aryl; X is selected from the group consisting of oxygen, sulfur, and selenium; N is nitrogen; O is oxygen; and Z is a suitable aromatic component.

The following Examples are provided to further define various aspects of the present invention, it being noted that these Examples are intended to illustrate and not limit the scope of the present invention.

EXAMPLE I
Synthesis of Bis[2-(2-hydroxyphenyl)-5-phenyl-1,3,4-oxadiazolato]zinc

In a 250 milliliter flask equipped with a magnetic stirrer were added 2-(2-acetoxyphenyl)-5-phenyl-1,3,4-oxadiazole (4.5 grams, 12.6 mmol), which was prepared according to the literature synthetic procedure (J. Bettenhausen, P. Strohriegl, *Macromol. Rapid Commun.* 1996, 17, page 623), the disclosure of which is totally incorporated herein by reference, ethanol (100 milliliters), and 3.8 milliliters of 50 percent sodium hydroxide aqueous solution. The reaction mixture was stirred at reflux for 3.0 hours. After cooling to room temperature, the precipitated solids were collected by filtration, and the wet solids were returned to the reaction flask without further drying. To the flask were added methanol (80 milliliters) and zinc chloride (1.0 grams, 7.3 mmol), and the mixture was stirred at reflux for an additional 3.0 hours. The reaction contents were cooled to room temperature, about 25° C. throughout, and the precipitated solids were collected, washed with water and methanol, and dried in vacuum to provide 2.6 grams of powder. The above product of bis[2-(2-hydroxyphenyl)-5-phenyl-1,3,4-oxadiazolato]zinc was further purified by sublimation. IR (Kbr): 1607, 1531, 1471, 1439, 1342, 1285, 857, 778, 756 cm$^{-1}$. Elemental Analysis: Calculated: C, 62.29; H, 3.37; N, 10.39. Found: C, 62.21; H, 3.28; N, 10.29.

EXAMPLE II
Synthesis of Bis[2-(2-hydroxyphenyl)-5-(1-naphthyl)-1,3,4-oxadiazolato]zinc In a 200 milliliter flask equipped with a magnetic stirrer were added 2-(2-acetoxyphenyl)-5-(1-naphthyl)-1,3,4-oxadiazole (5.0 grams, 15.1 mmol), which was prepared according to the literature synthetic procedure cited above, ethanol (150 milliliters), and 3.6 milliliters of 50 percent sodium hydroxide aqueous solution. The reaction mixture was stirred at reflux for 3.0 hours. After cooling to room temperature, the precipitated solids were collected by filtration, and the wet solids were returned to the reaction flask without further drying. To the flask were added methanol (80 milliliters) and zinc chloride (1.03 grams, 7.3 mmol), and the mixture was stirred at reflux for an additional 3.0 hours. The reaction contents were cooled to room temperature, and the precipitated solids were collected, washed with water and methanol, and dried in vacuum to provide 4.2 grams of powder. The above product was further purified by sublimation. IR (Kbr): 1607, 1559, 1433, 1260, 1250, 804, 754, 773 cm$^{-1}$. Elemental Analysis: Calculated: C, 67.56; H, 3.47; N, 8.76. Found: C, 67.51; H, 3.21; N, 8.53.

EXAMPLE III
Synthesis of Bis[2-(2-hydroxyphenyl)-5-(1-naphthyl)-1,3,4-oxadiazolate]beryllium In a 200 milliliter flask equipped with a magnetic stirrer were added 2-(2-acetoxyphenyl)-5-(1-naphthyl)-1,3,4-oxadiazole (2.2 grams, 6.66 mmol), ethanol (50 milliliters), and 1.6 milliliters of 50 percent sodium hydroxide aqueous solution. The reaction mixture was stirred at reflux for 3.0 hours. After cooling to room temperature, the precipitated solids were collected by filtration, and the wet solids were returned to the reaction flask without further drying. To the flask were added methanol (80 milliliters) and beryllium sulfate tetrahydrate (0.58 gram, 3.27 mmol), and the mixture was stirred at reflux for an additional 3.0 hours. The reaction contents were cooled to room temperature, and the precipitated solids were collected, washed with water and methanol, and dried in vacuum to provide 1.53 grams of powder. The above product was further purified by sublimation. IR (Kbr): 1617, 1567, 1477, 1443, 1340, 912, 778, 764 cm$^{-1}$. Elemental Analysis: Calculated: C, 74.08; H, 3.81; N, 9.60. Found: C, 74.03; H, 3.74; N, 9.58.

EXAMPLE IV

Synthesis of Bis[5-bisphenyl-2-(2-hydroxyphenyl)-1,3,4-oxadiazolato]zinc

In a 200 milliliter flask equipped with a magnetic stirrer were added 2-(2-acetoxyphenyl)-5-biphenyl-1,3,4-oxadiazole (4.5 grams, 12.6 mmol), which was prepared according to the literature synthetic procedure cited above, ethanol (150 milliliters), and 3.0 milliliters of 50 percent sodium hydroxide aqueous solution. The reaction mixture was stirred at reflux for 3.0 hours. After cooling to room temperature, the precipitated solids were collected by filtration, and the wet solids were returned to the reaction flask without further drying. To the flask were added methanol (80 milliliters) and zinc chloride (0.86 grams, 6.31 mmol), and the mixture was stirred at reflux for an additional 3.0 hours. The reaction contents were cooled to room temperature, and the precipitated solids were collected, washed with water and methanol, and dried in vacuum to provide 3.75 grams of powder. The product was further purified by sublimation. IR (Kbr): 1613, 1530, 1484, 1480, 1472, 1513, 1433, 1342, 1259, 847, 769, 759, 730 cm$^{-1}$. Elemental Analysis: Calculated: C, 69.41; H, 3.79; N, 8.10. Found: C, 69.15; H, 3.52; N, 7.95.

EXAMPLE V

An organic EL was prepared in the following manner:

1. An indium tin oxide (ITO), 500 Angstroms in thickness, coated glass substrate, which substrate was thin and was of a thickness of about 1 millimeter, was cleaned with a commercial detergent, rinsed with deionized water, and dried in a vacuum oven at 60° C. for 1 hour. Immediately before use, the glass was treated with UV ozone for 0.5 hour.

2. The ITO substrate was then placed in a vacuum deposition chamber. The deposition rate and layer thickness were controlled by an Inficon Model IC/5 controller. Under a pressure of 5×10$^{-6}$ Torr, the hole transport compound, N,N'-diphenyl-N,N'-bis(3-methylphenyl)-1,1'-biphenyl-4,4'-diamine, was evaporated from an electrically heated tantalum boat to deposit an 80 nanometers thick layer on the glass/ITO at a rate of 0.6 nanometer/second.

3. Onto the hole transport layer of 2 above was deposited bis[2-(hydroxyphenyl)-5-phenyl-1,3,4-oxadiazolate]zinc at a rate of 0.6 nanometer/second to form an 80 nanometers thick layer, and which compound functioned as an electron injector and primarily as an electron transport medium or layer, and which compound was obtained from Example I.

4. A 100 nanometer cathode of magnesium silver alloy was then deposited at a total deposition rate of 0.5 nanometer/second onto the electron injecting and transporting layer 3 above by simultaneous evaporation from two independently controlled tantalum boats containing Mg and Ag, respectively. A typical composition was 9:1 in atomic ratio of Mg to Ag. Finally, a 200 nanometer silver layer was overcoated on the Mg:Ag cathode for the primary purpose of protecting the reactive Mg from ambient moisture.

The device as prepared above was retained in a dry box which was continuously purged with nitrogen gas. Its performance was assessed by measuring its current-voltage characteristics and light output under a direct current measurement. The current-voltage characteristics were determined with a Keithley Model 238 High Current Source Measure Unit. The ITO electrode was always connected to the positive terminal of the current source. At the same time, the light output from the device was monitored by a silicon photodiode.

When a positive bias voltage was applied to the ITO electrode, this device emitted blue light with a peak emission at 480 nanometers and provided a light intensity of 780 cd/cm$^2$ at 14 volts. In a stability test with a constant current of 25 mA/cm$^2$ the device provided an initial light output of 350 cd/m$^2$. The light intensity degraded slowly, with a 50 percent reduction after 150 hours of continuous operation.

EXAMPLE VI

An organic EL device was prepared in accordance with Example V except that bis[2-(hydroxyphenyl)-5-(1-naphthyl)-1,3,4-oxadiazolate]zinc was utilized in place of bis[2-(hydroxyphenyl)-5-phenyl-1,3,4-oxadiazolate]zinc.

When a positive bias voltage was applied to the ITO electrode, this device emitted greenish blue light with a peak emission at 490 nanometers and provided a light intensity of 980 cd/cm$^2$ at 14 volts. In a stability test with a constant current of 25 mA/cm$^2$, the device provided an initial light output of 450 cd/M$^{-2}$. The light intensity degraded slowly, with a 50 percent reduction after 210 hours of continuous operation.

EXAMPLE VII

An organic EL device was prepared in accordance with Example V except that bis[5-biphenyl-2-(2-hydroxyphenyl)-1,3,4-oxadiazolato]zinc was utilized in place of bis[2-(hydroxyphenyl)-5-phenyl-1,3,4-oxadiazolate]zinc.

When a positive bias voltage was applied to the ITO electrode, this device emitted greenish blue light with a peak emission at 485 nanometers and provided a light intensity of 850 cd/cm$^2$ at 14 volts. In a stability test with a constant current of 25 mA/cm$^2$, the device provided an initial light output of 420 cd/$^{-2}$. The light intensity degraded slowly, with a 50 percent reduction after 145 hours of continuous operation.

EXAMPLE VIII

An organic EL device was prepared in the following manner:

Under a pressure of 5×10$^{-6}$ Torr, an 80 nanometer hole transporting layer of N,N'-di-1-naphthyl-N,N'-diphenyl-1,1'-biphenyl-4,4'-diamine was deposited onto the glass/ITO of Example V, at an evaporation rate of 0.6 nanometer/second. Onto the hole transport layer was deposited at a rate of 0.6 nanometer/second the electron transport layer bis[2-(2-hydroxyphenyl)-5-(1-naphthyl)-1,3,4-oxadiazolate]beryllium obtained in Example III to form a 50 nanometer luminescent layer. Additionally, a 30 nanometer electron transport of tris(8-hydroxyquinolinate)aluminum was deposited in a similar manner onto the luminescent layer. The device was completed by deposition of a cathode as described in Example V.

When a positive bias voltage was applied to the ITO electrode, this device emitted blue light with a peak emission at 480 nanometers and provided a light intensity of 750 cd/cm$^2$ at 14 volts. In a stability test with a constant current of 25 mA/cm$^2$, the device provided an initial light output of 350 cd/M$^2$. The light intensity degraded slowly, with a 50 percent reduction after 180 hours of continuous operation.

Modifications of the present invention may occur to those of ordinary skill in the art subsequent to review of the present application. These modifications and equivalents thereof are intended to be included within the scope of the invention.

What is claimed is:

1. A metal chelate compound of formula (I)

$$L_n\text{—}M^{+n} \qquad (I)$$

wherein M represents a metal; n is the number 1, 2, or 3; and L is a ligand of formula (II)

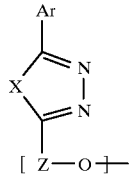
(II)

wherein Ar is aryl; X is selected from the group consisting of oxygen, sulfur, and selenium; N is nitrogen; O is oxygen; and Z is an aromatic component, and wherein said metal M forms a coordinate bond with the nitrogen N in the three position, and wherein said metal M forms a covalent bond with said oxygen of the Z—O segment.

2. A compound in accordance with claim 1 wherein M is a Group (I), or Group (II) metal.

3. A compound in accordance with claim 1 wherein M is zinc, or beryllium.

4. A compound in accordance with claim 1 wherein Ar contains from about 6 to about 30 carbon atoms, and Z is 1,2-phenylene, 1,2-naphthylene, 2,3-naphthylene, 3,4-pyridinediyl, 3,4-quinolinediyl, and their substituted analogs with the substituents for said analogs being selected from the group consisting of halogen, alkoxy, carboxy, cyano, alkyl with 1 to 5 carbon atoms, phenyl, or aryl with a substituent, wherein the substituent for the aryl is halogen, alkyl with 1 to 5 carbons, or alkoxy groups with 1 to 5 carbons.

5. A compound in accordance with claim 1 wherein said metal chelate compound is selected from the group consisting of bis[2-(2-hydroxyphenyl)-5-phenyl-1,3,4-oxadiazolato]zinc; bis[2-(2-hydroxyphenyl)-5-phenyl-1,3,4-oxadiazolato]beryllium; bis[2-(2-hydroxyphenyl)-5-(1-naphthyl)-1,3,4-oxadiazolato]zinc; bis[2-(2-hydroxyphenyl)-5-(1-naphthyl)-1,3,4-oxadiazolato]beryllium; bis[5-biphenyl-2-(2-hydroxyphenyl)-1,3,4-oxadiazolato]zinc; bis[5-biphenyl-2-(2-hydroxyphenyl)-1,3,4-oxadiazolato]beryllium; bis[2-(2-hydroxyphenyl)-5-p-tolyl-1,3,4-oxadiazolato]zinc; bis[2-(2-hydroxyphenyl)-5-p-tolyl-1,3,4-oxadiazolato]beryllium; bis[5-(p-tert-butylphenyl)-2-(2-hydroxyphenyl)-1,3,4-oxadiazolato]zinc; bis[5-(p-tert-butylphenyl)-2-(2-hydroxyphenyl)-1,3,4-oxadiazolato]beryllium; bis[2-(2-hydroxyphenyl)-5-(3-fluorophenyl)-1,3,4-oxadiazolato]zinc; bis[2-(2-hydroxyphenyl)-5-(4-fluorophenyl)-1,3,4-oxadiazolato]zinc; bis[2-(2-hydroxyphenyl)-5-(4-fluorophenyl)-1,3,4-oxadiazolato]beryllium; bis[5-(4-chlorophenyl)-2-(2-hydroxyphenyl)-1,3,4-oxadiazolato]zinc; bis[2-(2-hydroxyphenyl)-5-(4-methoxyphenyl)-1,3,4-oxadiazolato]zinc; bis[2-(2-hydroxy-4-methylphenyl)-5-phenyl-1,3,4-oxadiazolato]zinc; bis[2-α-(2-hydroxynaphthyl)-5-phenyl-1,3,4-oxadiazolato]zinc; bis[2-(2-hydroxyphenyl)-5-p-pyridyl-1,3,4-oxadiazolato]zinc; bis[2-(2-hydroxyphenyl)-5-p-pyridyl-1,3,4-oxadiazolato]beryllium; bis[2-(2-hydroxyphenyl)-5-(2-thiophenyl)-1,3,4-oxadiazolato]zinc; bis[2-(2-hydroxyphenyl)-5-phenyl-1,3,4-thiadiazolato]zinc; bis[2-(2-hydroxyphenyl)-5-phenyl-1,3,4-thiadiazolato]beryllium; bis[2-(2-hydroxyphenyl)-5-(1-naphthyl)-1,3,4-thiadiazolato]zinc; and bis[2-(2-hydroxyphenyl)-5-(1-naphthyl)-1,3,4-thiadiazolato]beryllium.

6. A device in accordance with claim 1 wherein Z is 1,2-phenylene.

7. A device in accordance with claim 1 wherein said metal is beryllium.

8. An organic electroluminescent device comprised of an anode and a cathode, and situated therebetween (a) a hole injecting and hole transporting layer or zone, and thereover (b) an electron injecting and electron transport layer or zone containing a metal chelate compound of formula (I)

$$L_n\text{—}M^{+n} \qquad (I)$$

wherein M represents a metal; n is a number of from 1 to 3; and L is a ligand of Formula (II)

(II)

wherein Ar is aryl; X is selected from the group consisting of oxygen, sulfur, and selenium; N is nitrogen; O is oxygen; and Z is an aromatic components and wherein said metal M forms a coordinate bond with the nitrogen N in the three position, and wherein said metal M forms a covalent bond with said oxygen of the Z—O segment.

9. An organic electroluminescent device in accordance with claim 8 wherein said metal is selected from the metals in Group (I), Group (II) and Group (III) of the Periodic Table.

10. An organic electroluminescent device in accordance with claim 8 wherein said metal is zinc or beryllium.

11. An organic electroluminescent device in accordance with claim 8 wherein X is oxygen or sulfur.

12. An organic electroluminescent device in accordance with claim 8 wherein said metal chelate compound is selected from the group consisting of bis[2-(2-hydroxyphenyl)-5-phenyl-1,3,4-oxadiazolato]zinc; bis[2-(2-hydroxyphenyl)-5-phenyl-1,3,4-oxadiazolato]beryllium; bis[2-(2-hydroxyphenyl)-5-(1-naphthyl)-1,3,4-oxadiazolato]zinc; bis[2-(2-hydroxyphenyl)-5-(1-naphthyl)-

1,3,4-oxadiazolato]beryllium; bis[5-biphenyl-2-(2-hydroxyphenyl)-1,3,4-oxadiazolato]zinc; bis[5-biphenyl-2-(2-hydroxyphenyl)-1,3,4-oxadiazolato]beryllium; bis(2-hydroxyphenyl)-5-phenyl-1,3,4-oxadiazolato lithium; bis[2-(2-hydroxyphenyl)-5-p-tolyl-1,3,4-oxadiazolato]zinc; bis[2-(2-hydroxyphenyl)-5-p-tolyl-1,3,4-oxadiazolato]beryllium; bis[5-(p-tert-butylphenyl)-2-(2-hydroxyphenyl)-1,3,4-oxadiazolato]zinc; bis[5-(p-tert-butylphenyl)-2-(2-hydroxyphenyl)-1,3,4-oxadiazolato]beryllium; bis[2-(2-hydroxyphenyl)-5-(3-fluorophenyl)-1,3,4-oxadiazolato]zinc; bis[2-(2-hydroxyphenyl)-5-(4-fluorophenyl)-1,3,4-oxadiazolato]zinc; bis[2-(2-hydroxyphenyl)-5-(4-fluorophenyl)-1,3,4-oxadiazolato]beryllium; bis[5-(4-chlorophenyl)-2-(2-hydroxyphenyl)-1,3,4-oxadiazolato]zinc; bis[2-(2-hydroxyphenyl)-5-(4-methoxyphenyl)-1,3,4-oxadiazolato]zinc; bis[2-(2-hydroxy-4-methylphenyl)-5-phenyl)-1,3,4-oxadiazolato]zinc; bis[2-α-(2-hydroxynaphthyl)-5-phenyl-1,3,4-oxadiazolato]zinc; bis[2-(2-hydroxyphenyl)-5-p-pyridyl-1,3,4-oxadiazolato]zinc; bis[2-(2-hydroxyphenyl)-5-p-pyridyl-1,3,4-oxadiazolato]beryllium; bis[2-(2-hydroxyphenyl)-5-(2-thiophenyl)-1,3,4-oxadiazolato]zinc; bis[2-(2-hydroxyphenyl)-5-phenyl-1,3,4-thiadiazolato]zinc; bis[2-(2-hydroxyphenyl)-5-phenyl-1,3,4-thiadiazolato]beryllium; bis[2-(2-hydroxyphenyl)-5-(1-naphthyl)-1,3,4-thiadiazolato]zinc; and bis[2-(2-hydroxyphenyl)-5-(1-naphthyl)-1,3,4-thiadiazolato]beryllium.

13. An organic electroluminescent device in accordance with claim 8 comprising in the following sequence a substrate, thereover an anode, in contact with the anode a hole injecting layer and thereover a hole transport layer, thereover an electron transport layer and an electron injecting layer, and a cathode; and wherein the cathode is in contact with the electron injecting layer.

14. An organic electroluminescent device in accordance with claim 13 wherein said electron injection layer is comprised of a metal oxinoid compound.

15. An organic electroluminescent device in accordance with claim 14 wherein said metal oxinoid compound is tris(8-hydroxyquinolinate)aluminum, or bis(8-quinolinethiolato)zinc.

16. An electroluminescent device in accordance with claim 8 wherein Z is selected from the group consisting of 1,2-phenylene, 1,2-naphthylene, 2,3-naphthylene, and 3,4-pyridinediyl.

17. An electroluminescent device in accordance with claim 8 wherein said metal chelate compound is selected from the group consisting of bis[2-(2-hydroxyphenyl)-5-phenyl-1,3,4-oxadiazolato]zinc; bis[2-(2-hydroxyphenyl)-5-phenyl-1,3,4-oxadiazolato]beryllium; bis[2-(2-hydroxyphenyl)-5-(1-naphthyl)-1,3,4-oxadiazolato]zinc; bis[2-(2-hydroxyphenyl)-5-(1-naphthyl)-1,3,4-oxadiazolato]beryllium; bis[5-biphenyl-2-(2-hydroxyphenyl)-1,3,4-oxadiazolato]beryllium, and bis[5-biphenyl-2-(2-hydroxyphenyl)-1,3,4-oxadiazolato]zinc.

18. An electroluminescent device in accordance with claim 8 further containing a substrate in contact with said anode, and thereon said cathode a protective coating.

19. An electroluminescent device in accordance with claim 18 wherein the anode is comprised of a layer of indium tin oxide having a thickness ranging from about 300 Å to about 1,000 Å, the hole injecting/hole transporting layer is comprised of a tertiary aromatic amine and is of a thickness ranging from about 100 Å to about 800 Å, the electron injecting/electron transporting metal chelate layer is of a thickness ranging from about 100 Å to about 800 Å, and the cathode is a magnesium/silver alloy or a lithium/aluminum alloy and is of a thickness ranging from about 100 Å to about 2000 Å.

20. An electroluminescent device in accordance with claim 18 wherein said aromatic component is 1,2-phenylene, 1,2-naphthylene, 2,3-naphthylene, 3,4-pyridinediyl, or 3,4-quinolinediyl.

21. An electroluminescent device in accordance with claim 18 wherein said aromatic component is 1,2-phenylene, 1,2-naphthylene, 2,3-naphthylene, 3,4-pyridinediyl, 3,4-quinolinediyl, and their substituted analogs with the substituents for said analogs being selected from the group consisting of halogen, alkoxy, carboxy, cyano, alkyl with 1 to 5 carbon atoms, phenyl, and aryl with a substituent, wherein the substituent for the aryl is halogen, alkyl with 1 to 5 carbons, or alkoxy groups with 1 to 5 carbons.

22. An electroluminescent device in accordance with claim 8 wherein said device further comprises in the following sequence a substrate, an anode, a hole injecting layer, a hole transport layer, an electron transport layer, an electron injecting layer, and a cathode; and wherein said electron transport layer is comprised of said metal chelate.

23. An electroluminescent device in accordance with claim 22 wherein said metal chelate compound is selected from the group consisting of bis[2-(2-hydroxyphenyl)-5-phenyl-1,3,4-oxadiazolato]zinc; bis[2-(2-hydroxyphenyl)-5-phenyl-1,3,4-oxadiazolato]beryllium; bis[2-(2-hydroxyphenyl)-5-(1-naphthyl)-1,3,4-oxadiazolato]zinc; bis[2-(2-hydroxyphenyl)-5-(1-naphthyl)-1,3,4-oxadiazolato]beryllium; bis[5-biphenyl-2-(2-hydroxyphenyl)-1,3,4-oxadiazolato]zinc; bis[5-biphenyl-2-(2-hydroxyphenyl)-1,3,4-oxadiazolato]beryllium; bis[2-(2-hydroxyphenyl)-5-p-tolyl-1,3,4-oxadiazolato]zinc; bis[2-(2-hydroxyphenyl)-5-p-tolyl-1,3,4-oxadiazolato]beryllium; bis[5-(p-tert-butylphenyl)-2-(2-hydroxyphenyl)-1,3,4-oxadiazolato]zinc; bis[5-(p-tert-butylphenyl)-2-(2-hydroxyphenyl)-1,3,4-oxadiazolato]beryllium; bis[2-(2-hydroxyphenyl)-5-(3-fluorophenyl)-1,3,4-oxadiazolato]zinc; bis[2-(2-hydroxyphenyl)-5-(4-fluorophenyl)-1,3,4-oxadiazolato]zinc; bis[2-(2-hydroxyphenyl)-5-(4-fluorophenyl)-1,3,4-oxadiazolato]beryllium; bis[5-(4-chlorophenyl)-2-(2-hydroxyphenyl)-1,3,4-oxadiazolato]zinc; bis[2-(2-hydroxyphenyl)-5-(4-methoxyphenyl)-1,3,4-oxadiazolato]zinc; bis[2-(2-hydroxy-4-methylphenyl)-5-phenyl-1,3,4-oxadiazolato]zinc; bis[2-α-(2-hydroxynaphthyl)-5-phenyl-1,3,4-oxadiazolato]zinc; bis[2-(2-hydroxyphenyl)-5-p-pyridyl-1,3,4-oxadiazolato]zinc; bis[2-(2-hydroxyphenyl)-5-p-pyridyl-1,3,4-oxadiazolato]beryllium; bis[2-(2-hydroxyphenyl)-5-(2-thiophenyl)-1,3,4-oxadiazolato]zinc; bis[2-(2-hydroxyphenyl)-5-phenyl-1,3,4-thiadiazolato]zinc; bis[2-(2-hydroxyphenyl)-5-phenyl-1,3,4-thiadiazolato]beryllium; bis[2-(2-hydroxyphenyl)-5-(1-naphthyl)-1,3,4-thiadiazolato]zinc; and bis[2-(2-hydroxyphenyl)-5-(1-naphthyl)-1,3,4-thiadiazolato]beryllium.

24. An electroluminescent device comprised of (a) an anode on an optional supporting substrate; (b) a hole transporting hole injecting layer; (c) an electron transporting electron injecting layer; and (d) a cathode; wherein said layer (c) is comprised of a metal chelate compound of formula (I)

$$L_n\text{—}M^{+n} \qquad (I)$$

wherein M represents a metal; n is a number of from 1 to 3; and L is a ligand of formula (II)

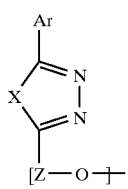 (II)

wherein Ar is aryl; X is selected from the group consisting of oxygen, sulfur, and selenium; N is nitrogen; O is oxygen; and Z is an aromatic component, and wherein said metal M forms a coordinate bond with the nitrogen N in the three position, and wherein said metal M forms a covalent bond with said oxygen of the Z—O segment.

25. A device in accordance with claim 24 wherein Z is 1,2-phenylene.

26. A device in accordance with claim 24 wherein said metal is beryllium.

* * * * *